US011057453B2

(12) United States Patent
Ashraf

(10) Patent No.: US 11,057,453 B2
(45) Date of Patent: Jul. 6, 2021

(54) LOCKING OF CLIENT SESSION USING EVENT LISTENER

(71) Applicant: NETIQ CORPORATION, Houston, TX (US)

(72) Inventor: Umar Ashraf, Bangalore (IN)

(73) Assignee: NETIQ CORPORATION, Houston, TX (US)

( * ) Notice: Subject to any disclaimer, the term of this patent is extended or adjusted under 35 U.S.C. 154(b) by 0 days.

(21) Appl. No.: 16/808,753

(22) Filed: Mar. 4, 2020

(65) Prior Publication Data

US 2020/0322414 A1 Oct. 8, 2020

(30) Foreign Application Priority Data

Apr. 8, 2019 (IN) ............................ 201941014191

(51) Int. Cl.

*G06F 15/16* (2006.01)
*H04L 29/08* (2006.01)
*G06F 16/957* (2019.01)
*H04L 29/06* (2006.01)
*G06F 16/958* (2019.01)

(52) U.S. Cl.

CPC ............ *H04L 67/02* (2013.01); *G06F 16/958* (2019.01); *G06F 16/9577* (2019.01); *H04L 63/1416* (2013.01); *H04L 67/42* (2013.01); *H04L 69/329* (2013.01)

(58) Field of Classification Search

CPC ... H04L 67/02; H04L 63/1416; H04L 69/329; H04L 67/42; H04L 63/1441; H04L 67/146; H04L 67/142; G06F 16/9577; G06F 16/958; G06F 9/542

See application file for complete search history.

(56) References Cited

U.S. PATENT DOCUMENTS 8,875,268 B2 10/2014 Swerdlow
9,455,997 B2 9/2016 Shulman
9,866,638 B2 1/2018 Heymann
2004/0174391 A1 9/2004 Keohane
2010/0333167 A1* 12/2010 Luo ........................ H04L 63/20 726/1
2013/0219259 A1* 8/2013 Wilhelm .............. G06F 16/954 715/234
2016/0080345 A1* 3/2016 Safruti ................... H04L 67/02 726/6

(Continued)

OTHER PUBLICATIONS

Author Unknown: OWASP; Cross-Site Request Forgery (csrf); https://www.owasp.org/index.php/Cross-Site_Request_Forgery_(CSRF) ; Mar. 6, 2018; 6 pages.

(Continued)

*Primary Examiner* — John B Walsh

(57) ABSTRACT

In one implementation, a non-transitory machine-readable storage medium may store instructions that upon execution cause a processor to: receive a request for a webpage from a client device; in response to the received request, provide the webpage to a browser of the client device, the provided webpage including at least one event listener to detect a user change in the browser; receive a lock request from the at least one event listener on the client device; and in response to the received lock request, lock a session of the webpage on the client device.

20 Claims, 7 Drawing Sheets

(56) References Cited

U.S. PATENT DOCUMENTS

2017/0118218 A1 4/2017 Koottayi

OTHER PUBLICATIONS

Author Unknown; Be Smart and Reduce Memory Footpring and Gain in Usability in Google Chrome; Smart Tab Saver; http://www.smarttabsavercom; Dec. 2, 2018; 5 pages.

Author Unknown; Cross-Site Request Forgery (CSRF) Prevention Cheat Sheet; OWASP; https://www.owasp.org/index.php/Cross-Site_Request_Forgely_(CSRF)_Prevention_Cheat_Sheet; Oct. 15, 2018; 12 pages.

IBM; IBM Knowledge Center—User Session Security; IBM Security Access Manager for Enterprise Single Sign-On, Version 8.2.1; Dec. 2, 2018; 3 pages.

* cited by examiner

LOCKING OF CLIENT SESSION USING EVENT LISTENER

BACKGROUND

Computer systems may be subject to security attacks or exploits. For example, a Cross Site Request Forgery (CSRF) attack may involve a malicious website causing a browser of a user to send an unauthorized command to a web server using an existing logged-on session. In this manner, the CSRF attack may access private data of the user, or may initiate changes on the web server without the user's knowledge or approval. For example, a malicious website can trigger the browser to send a request to an email provider to delete a particular email.

BRIEF DESCRIPTION OF THE DRAWINGS

Some implementations are described with respect to the following figures.

DETAILED DESCRIPTION

An entity may provide a website or web service to users. For example, a website of a bank may allow a user to deposit, manage, and/or transfer money in the user's account at the bank. Such websites may suffer from Cross Site Request Forgery (CSRF) attacks, thereby resulting in monetary loss and/or other negative effects (e.g., identify theft, negative credit impacts, etc.). Accordingly, a website provider may wish to prevent CSRF attacks that affect its users.

In accordance with some implementations, examples are provided for prevention of CSRF attacks. As described further below with reference to FIGS. 1-6, some implementations may include a first website providing a protected webpage. A browser may present the protected webpage, and may establish a session with the first website. The browser may execute one or more event listeners included in the protected webpage. In some implementations, an event listener may detect a user change in the browser that may indicate a navigation of the browser to a second website. In response, the event listener may send a lock request to the first website, thereby preventing execution of commands or actions triggered by malicious content of the second website. In this manner, some implementations may prevent or mitigate CSRF attacks.

Figure 1:
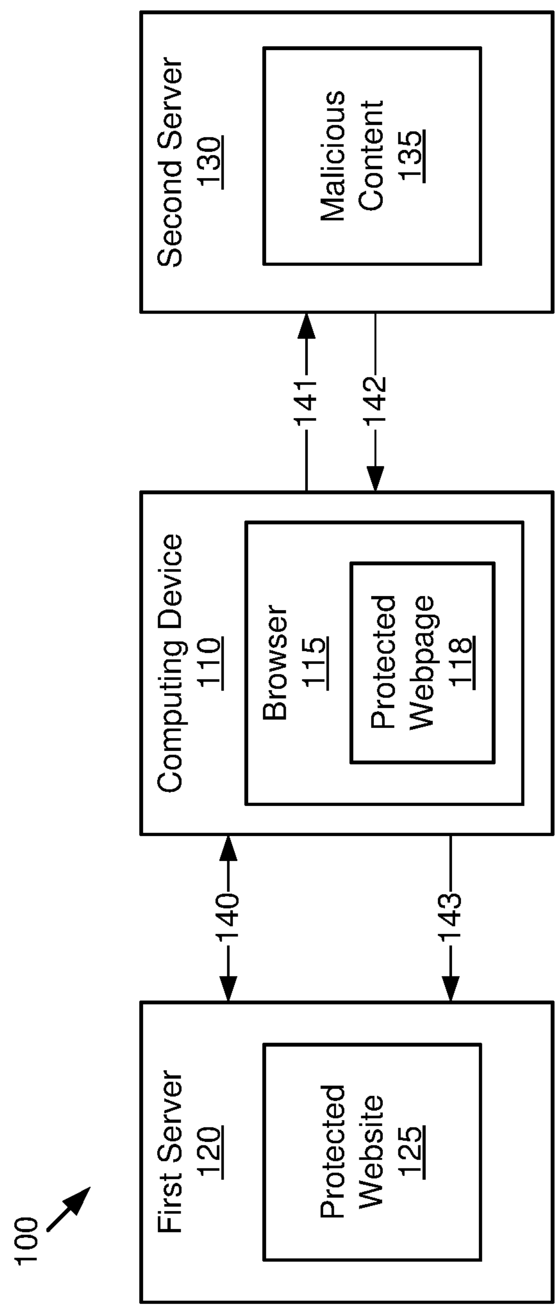
FIG. 1 is a schematic diagram of an example system, in accordance with some implementations.

Referring now to FIG. 1, shown is a schematic diagram of an example system 100, in accordance with some implementations. As shown, in some implementations, the system 100 may include a computing device 110, a first server 120, and a second server 130. The computing device 110 may be, for example, a desktop computer, a laptop, a smartphone, and so forth. In some implementations, the computing device 110 may include a browser 115 (e.g., a client application to process and display webpages including using HyperText Mark-up Language (HTML) and other content). In some examples, the browser 115 can concurrently present multiple webpages in multiple "tabs" (i.e., tabbed interfaces of browser 115 that can each present a distinct webpage). The computing device 110 may be connected to the first server 120 and the second server 130 via a network connection (e.g., a wired and/or wireless network).

In some implementations, the first server 120 may host a protected website 125 (e.g., an email service, a banking webpage, etc.). The browser 115 may send and/or receive data 140 to request the protected webpage 118 and establish a session with the protected website 125. For example, the browser 115 may provide a user identifier and password to log in to the protected website 125. After authenticating the user, the first server 120 may provide the browser 115 with the protected webpage 118 and a cookie (not shown in FIG. 1) to establish a session with the protected website 125.

In some examples, after establishing the session with the protected website 125, the browser 115 may access 141 the second server 130, and may receive a response 142 (e.g., a webpage) that includes malicious content 135. Assume that the malicious content 135 is hidden, and thus a user of the browser 115 may not be aware of the malicious content 135. For example, the response 142 may include a link that appears to request an embedded image, but may actually send a command to the first server 120 (e.g., "<img src='http:/firstserver/delete'>"). In another example, the response 142 may trigger a form submission in a manner that is not visible to a user of the browser 115 (e.g., an invisible HTML frame, a zero-pixel pop-up window, etc.)

In some examples, the malicious content 135 may attempt a CSRF attack via the browser 115. For example, the malicious content 135 may cause the browser 115 to send a hidden request (not shown in FIG. 1) to the first server 120, where the hidden request is intended to use the previously-established session to access data and/or perform changes on the first server 120 (e.g., read private information, transfer funds, etc.). If completed, such actions may result a harmful effect on the first server 120 and/or a user thereof.

In some implementations, the protected website 125 may include functionality to prevent CSRF attacks (e.g., via a hidden request triggered by the malicious content 135). In some examples, the protected website 125 may generate the protected webpage 118 to include one or more event listeners. As used herein, "event listener" refers to client-executable code to detect a user change in the browser 115. For example, an event listener may be implemented in JavaScript code embedded in a webpage. In some implementations, the user change detected by an event listener may indicate that the browser 115 is being directed to another website (e.g., a website on the second server 130), and thus potentially could be subject to a CSRF attack. An example implementation of the protected webpage 118 including event listeners is described below with reference to FIG. 2.

In some implementations, upon detecting a user change in the browser 115, an event listener may send a lock request 143 to the first server 120. In response to the lock request 143, the protected website 125 may lock the current session of the user, thereby preventing execution of commands under permissions associated with the session (e.g., read private information, transfer funds, delete data, and so forth). In this manner, hidden commands triggered by the malicious content 135 may be blocked, thereby protecting against a CSRF attack from the second server 130. In some examples, the session lock may be implemented by setting a lock flag (e.g., set to "on") associated with the session. When the session is locked, the protected website 125 may not complete any request associated with the session.

In one or more implementations, when the session is locked, the protected website 125 may respond to a request with a response that is not state-changing on the first server 120. For example, the protected website 125 may respond to a data access request by redirecting the browser 115 to a home page of the protected website 125. Further, loading the home page of the protected website 125 in the browser 115 may unlock the session. In this manner, any hidden commands triggered by the malicious content 135 may be blocked, while allowing the user to access the protected website 125 if needed. In some examples, the home page may include a listener that sends an unlock request when the home page is loaded in the browser 115.

In some implementations, a locked session may be unlocked by a user navigation to a webpage associated with the protected website 125. For example, the protected website 125 may unlock a session in response to a user loading a webpage associated with the protected website 125. This navigation may include the user reloading the protected webpage 118, loading a different webpage of the protected website 125, and so forth. In some examples, each webpage associated with the protected website 125 may include a listener that sends an unlock request when loaded in the browser 115.

In one or more implementations, a locked session may be unlocked by a user sending a request to unlock the session. For example, the protected website 125 may provide the user of the browser 115 with a control or interface (e.g., a pop-up window, a dialog box, etc.) to request the unlocking of the session. Upon receiving the unlock request, the protected website 125 may unlock the session. In some examples, the unlock request may only be sent upon authentication of the user (e.g., via human user validation via text or image recognition, user login, etc.).

In some implementations, the lock requests and/or unlock requests sent to the protected website 125 may be secured by including a validation value associated with the session (e.g., a hash of the session cookie). In some examples, the validation value in the request may be compared to a stored version of the same value. In some examples, timing buffers may be implemented at the computing device 110 and the first server 120 to avoid race conditions for lock requests and/or unlock requests (e.g., when switching between multiple browser tabs). In other examples, the first server 120 may continue to serve streams of data that were initiated prior to locking a session (e.g., a video playback, music streaming, and so forth). In some implementations, only state-changing actions (e.g., POST actions, PUT actions, DELETE actions, and so forth) may be blocked when a session is locked, while actions that are not state-changing (e.g., GET actions) may still be allowed.

Note that FIG. 1 shows an example system 100 that is simplified for the sake of clarity. However, implementations are not limited in this regard, and other examples are also possible. For example, while not shown for the sake of clarity, the computing system 110 and/or the servers 120, 130 may include various hardware components (e.g., processors, memory storage devices, buses, switches, batteries, antennas, power supplies, display devices, user interface devices, data buses, communication interfaces, and so forth) and software components (e.g., operating systems, drivers, applications, and so forth). Further, it is contemplated that the system 100 may include additional client devices, additional servers, additional event listeners, and so forth. Furthermore, the protected website 125 may include any number of protected webpages.

Figure 2:
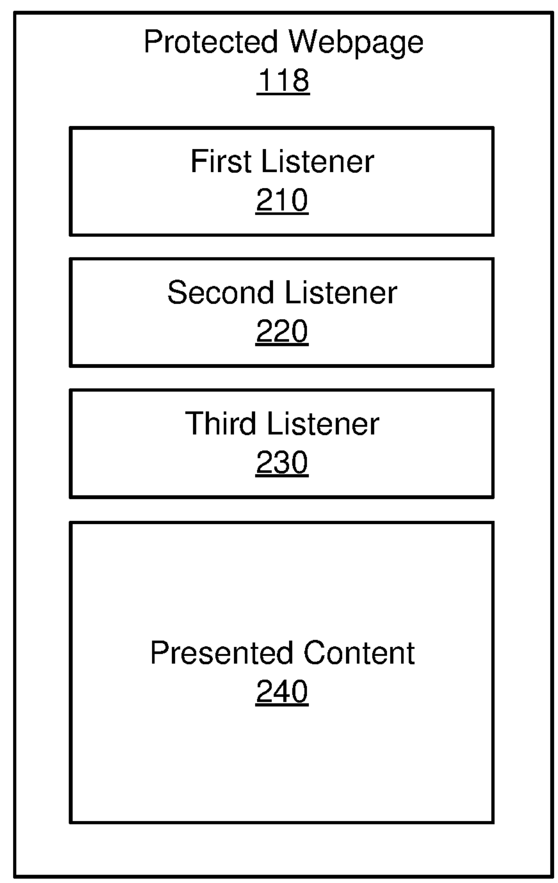
FIG. 2 is an illustration of an example protected webpage, in accordance with some implementations.

Referring now to FIG. 2, shown is an example protected webpage 118 in accordance with some implementations. As shown in FIG. 2, the example protected webpage 118 may include a first listener 210, a second listener 220, a third listener 230, and presented content 240. In some implementations, one or more of listeners 210, 220, 230 may be embedded in the protected webpage 118, and may be automatically executed in the browser 115 upon loading the protected webpage 118. In some examples, the execution of the listeners 210, 220, 230 is not presented to a user of the browser 115 (e.g., does not generate a visual result in the browser 115). In contrast, the presented content 240 may be presented to the user of the browser 115. For example, the presented content 240 may include text, graphics, and/or video displayed in a webpage.

In one or more implementations, the first listener 210 may detect events that change the website presented in a current tab of the browser 115, and in response may send a lock request to the website. For example, the first listener 210 may detect a user entry of a new web address in an address field of the current browser tab, a user selection of a bookmark or shortcut, and so forth. In some examples, the first listener 210 may ignore any navigation to a new web address that is still associated with the current session (e.g., to another webpage that is included in the protected website 125). In response to detecting a navigation of the browser 115, the first listener 210 may send the lock request 143 to the first server 120.

In one or more implementations, the second listener 220 may detect a user change of the focus of the browser 115 away from the current tab of the browser 115 (e.g., the currently selected tab in browser 115 that displays the protected webpage 118). For example, the second listener 220 may detect that a new tab is opened in browser 115, that the browser 115 is minimized, and so forth. In response to detecting a user change of the focus of the browser 115 away from the current window or tab of the browser 115, the second listener 220 may send the lock request 143 to the first server 120. As discussed above, the lock request 143 may lock the session associated with the protected webpage 118. In some examples, after the session is locked, the second listener 220 may detect a user change of the focus of the browser 115 back to the tab associated with the locked session (e.g., the user selects the tab that includes the protected webpage 118), and in response the second listener 220 may send an unlock request to unlock the session.

In one or more implementations, a session that is locked by the first listener 210 or the second listener 220 may be unlocked by a user navigation to any protected webpage 118 associated with the protected website 125 (i.e., any webpage in the protected website 125 that includes the listeners 210, 220, 230). In some examples, the third listener 230 may send an unlock request in response to the protected webpage 118 being loaded into the browser 115. For example, the session may be unlocked if the user reloads the initial protected webpage 118 (i.e., the webpage that caused the session to be locked), loads a home page of the protected website 125, and so forth.

In some implementations, if a session is locked and the server receives a browser request for an action that is not state-changing (i.e., harmless), the server may send the requested response, including the listeners 210, 220, 230.

Upon loading the response into the browser 115, the third listener 230 may unlock the session by sending an unlock request.

In some implementations, if a session is locked and the server receives a browser request for an action that is state-changing (i.e., not harmless), the server may redirect the browser 115 to a home page of the protected website 125, including the listeners 210, 220, 230. Upon loading the home page into the browser 115, the third listener 230 may unlock the session by sending an unlock request Note that, while FIG. 2 shows the protected webpage 118 as including three listeners 210, 220, 230, implementations are not limited in this regard, and other examples are also possible. For example, the protected webpage 118 may only include the first listener 210, may only include the second listener 220, may only include the third listener 230, may include additional event listeners, and so forth.

Figure 3A:
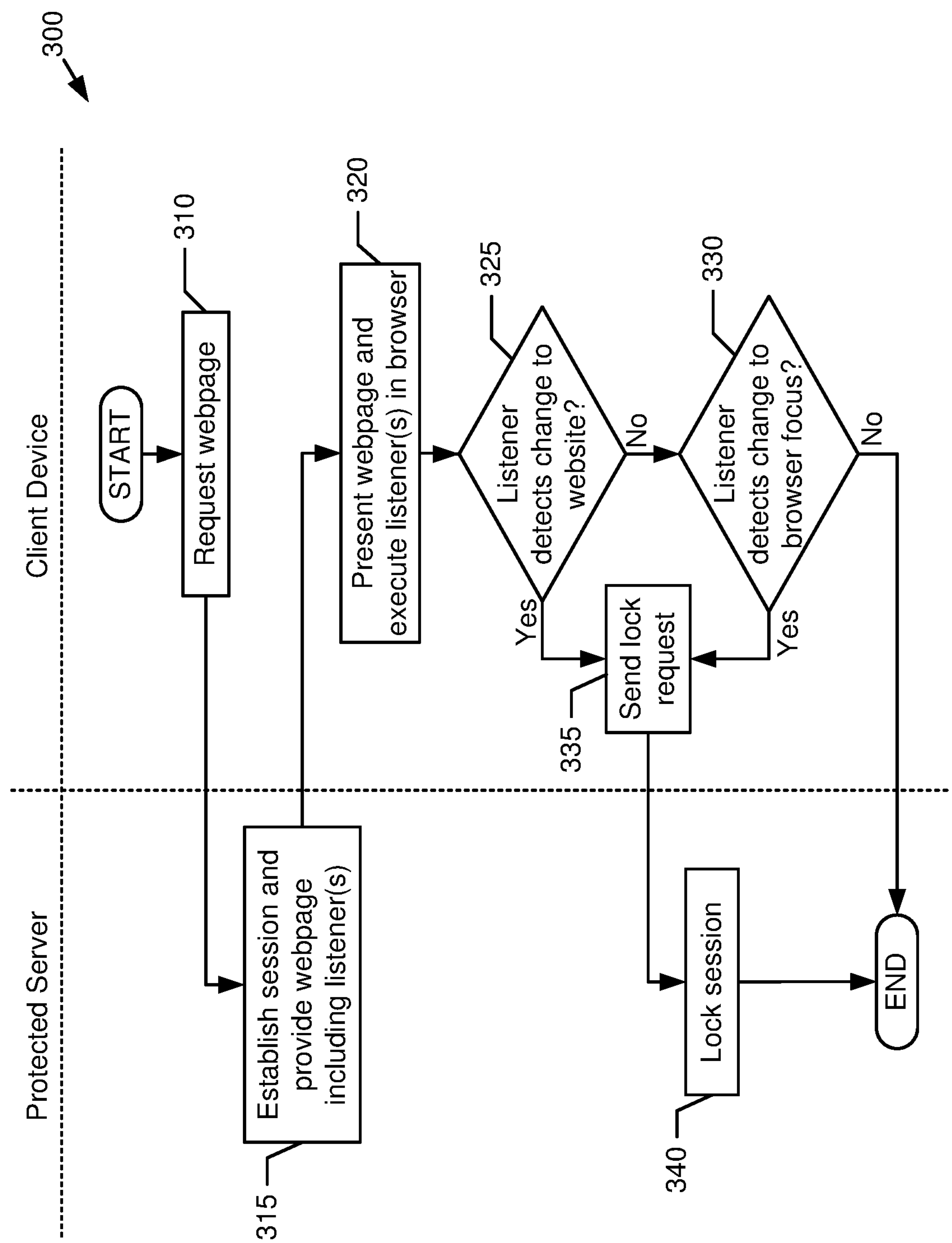
FIG. 3A-3C are illustrations of example processes, in accordance with some implementations.
Figure 3B:
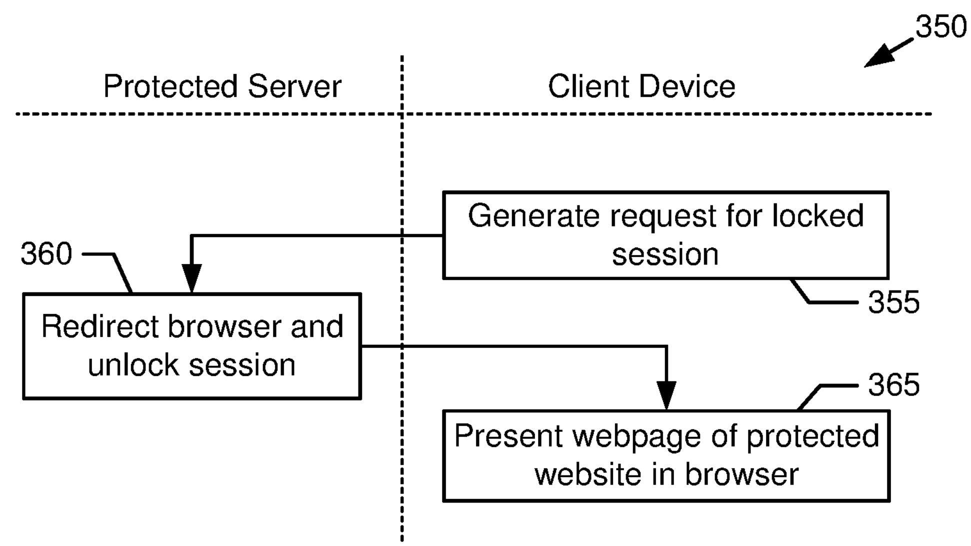
Figure 3C:
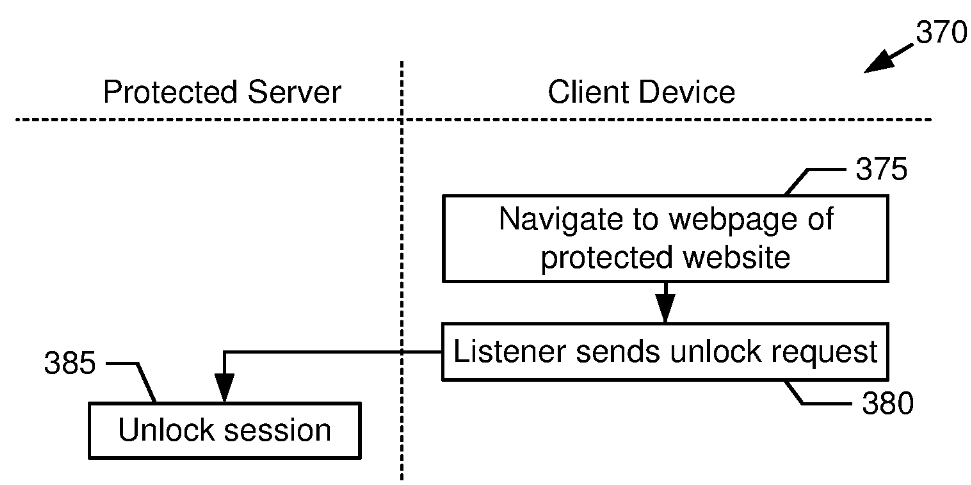

Referring now to FIGS. 3A-3C, shown respectively are example processes 300, 350, 370 in accordance with some implementations. Note that the processes 300, 350, 370 are illustrated in FIGS. 3A-3C as being divided into two portions, namely a set of actions performed by a protected server (e.g., first server 120 shown in FIG. 1) in a left portion, and a set of actions performed by a client device (e.g., computing device 110 shown in FIG. 1) in a right portion. However, implementations are not limited by FIGS. 3A-3C, and other examples are also possible. The processes 300, 350, 370 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the processes 300, 350, 370 may be described below with reference to FIGS. 1-2, which show examples in accordance with some implementations. However, other implementations are also possible.

Referring now to FIG. 3A, shown is an example process 300 for locking a session, in accordance with some implementations. Block 310 may include a client device requesting a webpage from a protected server. Block 315 may include the protected server establishing a session and providing the requested webpage including one or more listener(s). For example, referring to FIG. 1, a user of the browser 115 may provide data (e.g., web address, user name, password, etc.) to access a webpage of the protected website 125. In response, the first server 120 may provide the client device 110 with the protected webpage 118 and a cookie to establish a session with the protected website 125. In some implementations, the protected webpage 118 may include one or more event listeners to detect user changes in the browser 115. For example, referring to FIG. 2, the protected webpage 118 may include the first listener 210 and/or the second listener 220.

Block 320 may include the client device presenting the webpage and executing the one or more listener(s) in a browser. For example, referring to FIGS. 1-2, the browser 115 may display the presented content 240 included in the protected webpage 118. Further, the browser 115 may execute the first listener 210 and/or the second listener 220 in the background (e.g., without generating any visible content on the browser 115). For example, the first listener 210 may detect an event that changes the website presented in a current window or tab of the browser 115 (e.g., a user entry of a new web address in an address field of the current browser tab). In another example, the second listener 220 may detect a user change of the focus of the browser 115 away from the current window or tab of the browser 115 (e.g., a new tab is opened in browser 115, the browser 115 is minimized, and so forth).

At diamond 325, a determination is made as to whether an event listener has detected a change to the website presented in the browser. For example, referring to FIG. 2, the first listener 210 may detect events that change the website presented in a current window or tab of the browser 115. If it is determined at diamond 325 that an event listener has not detected a change to the website presented in the browser, then at diamond 330, a determination is made as to whether an event listener has detected a change of focus in the browser. For example, referring to FIG. 2, the second listener 220 may detect events that change the focus of the browser 115 away from a current window or tab of the browser 115. If it is determined at diamond 330 that an event listener has not detected a change of focus in the browser, then the process 300 is completed.

However, if it is determined at diamond 325 that an event listener has detected a change to the website presented in the browser, or if it is determined at diamond 330 that an event listener has detected a change of focus in the browser, then at block 335, the detecting event listener(s) may send the protected server a request to lock the current session of the browser. Further, at block 340, the protected server may lock the current session in response to the request from the event listener(s). For example, referring to FIGS. 1-2, the first listener 210 and/or the second listener 220 may send a lock request 143 to the first server 120, and in response the protected website 125 may lock a current session associated with the browser 115. In some implementations, the lock request 143 is a Hypertext Transfer Protocol (HTTP) request. After block 340, the process 300 may be completed.

Referring now to FIG. 3B, shown is an example process 350 for unlocking a session, in accordance with some implementations. Block 355 may include a client device generating a request associated with a locked session. Block 360 may include the protected server redirecting the browser to a home page of the protected website and unlocking the session. Block 365 may include the client device presenting the webpage of the protected server in the browser. For example, referring to FIGS. 1-2, assume that the protected website 125 has locked a current session associated with the browser 115 (e.g., in response to a lock request 143 from the first listener 210 or the second listener 220). The malicious content 135 may cause the browser 115 to generate a request to access the protected website 125 (e.g., a hidden request to transfer funds, copy account information, delete data, etc.). In response, the first server 120 may redirect the browser 115 to a home page of the protected website 125. In some examples, the home page may include the third listener 230 that sends an unlock request in response to being loaded into the browser 115. In other examples, the first server 120 may automatically unlock the session upon redirecting the browser 115 to the home page.

Referring now to FIG. 3C, shown is an example process 370 for unlocking a session, in accordance with some implementations. Block 375 may include the client device navigating to a webpage associated with the protected server. Block 380 may include an event listener on the webpage generating a request to unlock the locked session. Block 385 may include the protected server unlocking the session. For example, referring to FIGS. 1-2, assume that the protected website 125 has locked a current session associated with the browser 115 (e.g., in response to a lock request 143 from the first listener 210 or the second listener 220). A user may navigate the browser 115 to a webpage that is associated with the locked session (e.g., has used a back navigation button to return to the protected webpage 118, has entered an address of the home page of the protected website 125, and so forth). Further, the webpage may include the third listener 230. Upon loading the webpage in the browser 115, the third listener 230 that webpage may automatically send an unlock request to the first server 120. In response to the unlock request, the first server 120 may unlock the session associated with the protected website 125.

Figure 4:
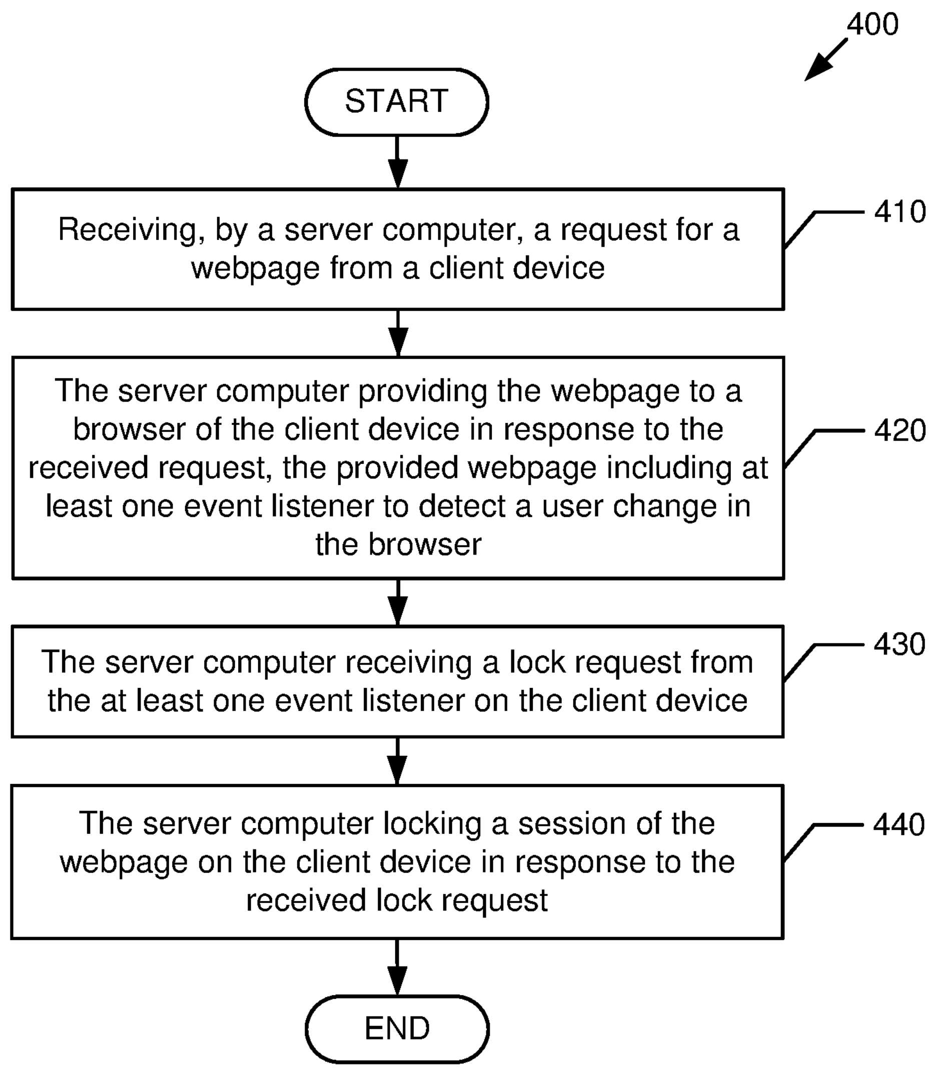
FIG. 4 is an illustration of an example process, in accordance with some implementations.

Referring now to FIG. 4, shown is an example process 400, in accordance with some implementations. The process 400 may performed by a server hosting a protected website (e.g., first server 120 shown in FIG. 1). However, implementations are not limited by FIG. 4, and other examples are also possible. The process 400 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-3, which show examples in accordance with some implementations. However, other implementations are also possible.

Block 410 may include receiving, by a server computer, a request for a webpage from a client device. For example, referring to FIG. 1, the first server 120 may receive a request from browser 115 to access the protected webpage 118 of the protected website 125. The protected webpage 118 may provide, for example, an email service, a banking service, a shopping service, an insurance service, and so forth.

Block 420 may include, the server computer providing the webpage to a browser of the client device in response to the received request, the provided webpage including one or more event listeners to detect a user change in the browser. For example, referring to FIGS. 1-2, the first server 120 may send the protected webpage 118 to the browser 115 on the computing device 110. In some implementations, the protected webpage 118 may include the first listener 210 and/or the second listener 220. In some examples, the first server 120 may also send a session cookie to the browser 115 on the computing device 110.

Block 430 may include the server computer receiving a lock request from the at least one event listener on the client device. For example, referring to FIGS. 1-2, the first listener 210 may detect an event that changes the website presented in a current window or tab of the browser 115 (e.g., a user entry of a new web address in an address field of the current browser tab), and in response the first listener 210 may send a lock request to the first server 120. In another example, the second listener 220 may detect a user change of the focus of the browser 115 away from the current window or tab of the browser 115 (e.g., a new tab is opened in browser 115, the browser 115 is minimized, and so forth), and in response may send a lock request to the first server 120.

Block 440 may include, the server computer locking a session of the webpage on the client device in response to the received lock request. For example, referring to FIG. 1, the first server 120 may receive a lock request from an event listener in the browser 115, and in response may lock a session associated with the browser 115. In some implementations, locking a session prevents execution of any requests or commands that may have a negative impact on the protected website 125 and/or a user thereof. For example, locking a session may cause the protected website 125 to ignore any requests from the browser 115 to modify data, read data, delete data, transfer funds, perform purchases, and so forth. In this manner, the protected website 125 may eliminate or mitigate CSRF attacks carried out through client devices (e.g., the computing device 110). After block 440, the process 400 may be completed.

Figure 5:
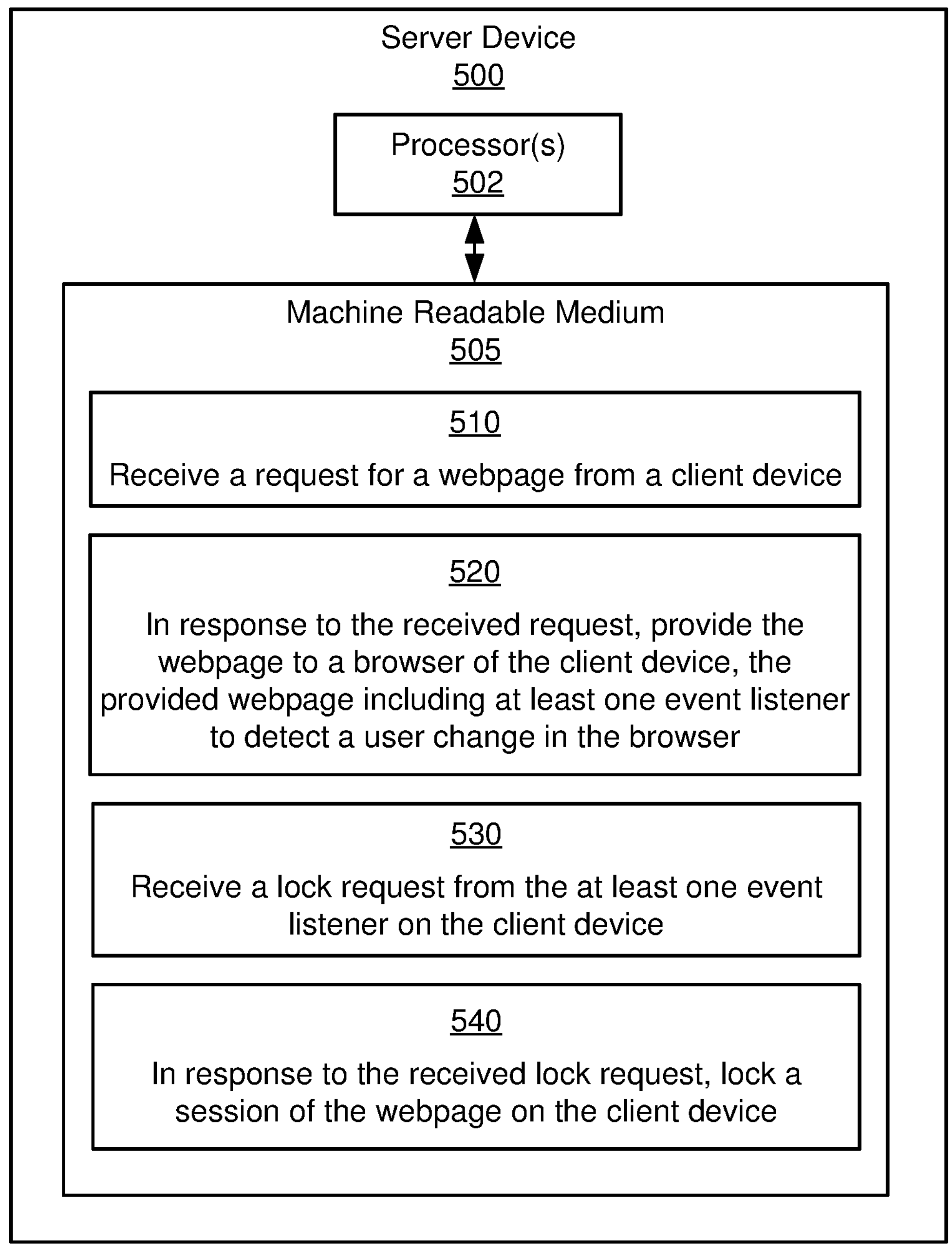
FIG. 5 is a schematic diagram of an example computing device, in accordance with some implementations

Referring now to FIG. 5, shown is a schematic diagram of an example computing device 500. In some examples, the computing device 500 may correspond generally to the first server 120 (shown in FIG. 1). As shown, the computing device 500 may include hardware processor(s) 502 and machine-readable storage medium 505 including instructions 510-540. The machine-readable storage medium 505 may be a non-transitory medium. The instructions 510-540 may be executable by the hardware processor(s) 502. The hardware processor(s) 502 may include a general purpose microprocessor, a specialized controller, a processor module or subsystem, a programmable integrated circuit, a programmable gate array, multiple processors, a microprocessor including multiple processing cores, and so forth.

Instruction 510 may be executed to receive a request for a webpage from a client device. For example, referring to FIG. 1, the first server 120 may receive a request from browser 115 to access the protected webpage 118.

Instruction 520 may be executed to, in response to the received request, provide the webpage to a browser of the client device, the provided webpage including at least one event listener to detect a user change in the browser. For example, referring to FIGS. 1-2, in response to the request from the browser 115, the first server 120 may send the protected webpage 118 to the browser 115. In some implementations, the protected webpage 118 may include the first listener 210 and/or the second listener 220. Further, in some examples, the first server 120 may also send a session cookie to the browser 115.

Instruction 530 may be executed to receive a lock request from the at least one event listener on the client device. For example, referring to FIGS. 1-2, the first listener 210 may detect an event that changes the website presented in a current window or tab of the browser 115, and in response the first listener 210 may send a lock request to the first server 120. In another example, the second listener 220 may detect a user change of the focus of the browser 115 away from the current window or tab of the browser 115, and in response may send a lock request to the first server 120.

Instruction 540 may be executed to, in response to the received lock request, lock a session of the webpage on the client device. For example, referring to FIG. 1, the first server 120 may receive a lock request from an event listener in the browser 115, and in response may lock a session associated with the browser 115.

Figure 6:
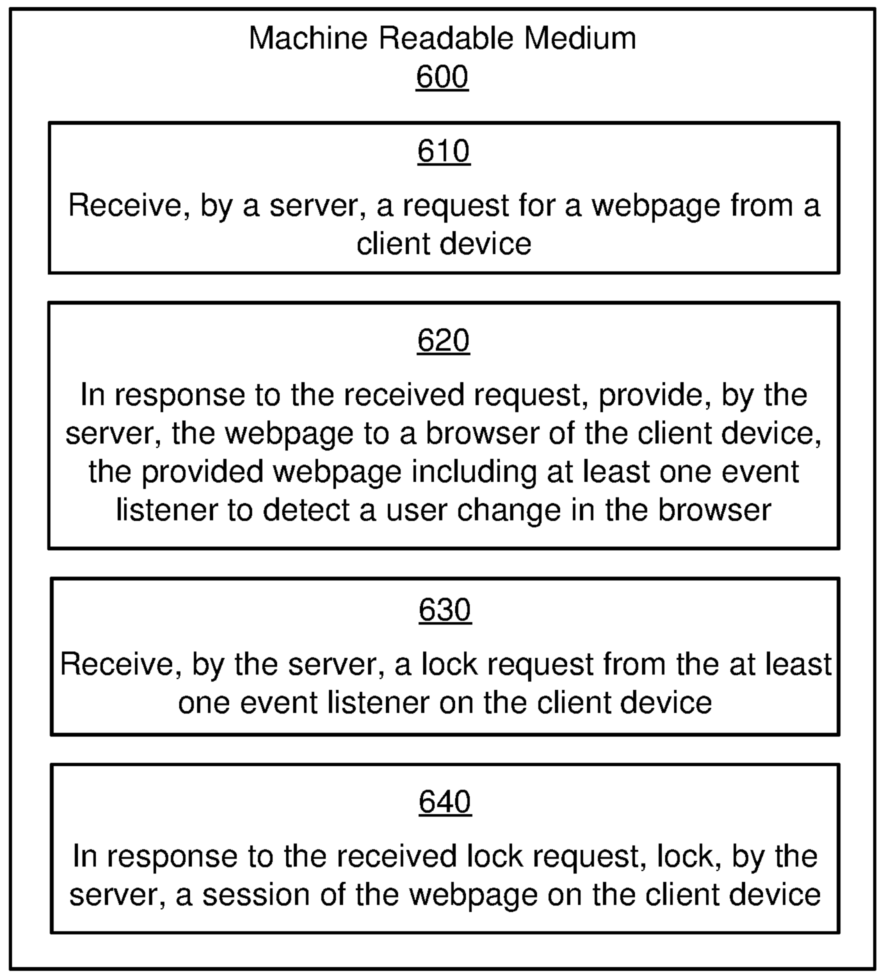
FIG. 6 is a diagram of an example machine-readable medium storing instructions in accordance with some implementations.

Referring now to FIG. 6, shown is machine-readable medium 600 storing instructions 610-640, in accordance with some implementations. The instructions 610-640 can be executed by one or more hardware processors. The machine-readable medium 600 may be a non-transitory storage medium, such as an optical, semiconductor, or magnetic storage medium.

Instruction 610 may be executed to receive, by a server, a request for a webpage from a client device. For example, referring to FIG. 1, the first server 120 may receive a request from browser 115 to access the protected webpage 118.

Instruction 620 may be executed to, in response to the received request, provide, by the server, the webpage to a browser of the client device, the provided webpage including at least one event listener to detect a user change in the browser. For example, referring to FIGS. 1-2, in response to the request from the browser 115, the first server 120 may send the protected webpage 118 to the browser 115. In some implementations, the protected webpage 118 may include the first listener 210 and/or the second listener 220. Further, in some examples, the first server 120 may also send a session cookie to the browser 115.

Instruction 630 may be executed to receive, by the server, a lock request from the at least one event listener on the client device. For example, referring to FIGS. 1-2, the first listener 210 may detect an event that changes the website presented in a current window or tab of the browser 115, and in response the first listener 210 may send a lock request to the first server 120. In another example, the second listener 220 may detect a user change of the focus of the browser 115 away from the current window or tab of the browser 115, and in response may send a lock request to the first server 120.

Instruction 640 may be executed to, in response to the received lock request, lock, by the server, a session of the webpage on the client device. For example, referring to FIG. 1, the first server 120 may receive a lock request from an event listener in the browser 115, and in response may lock a session associated with the browser 115.

Note that, while FIGS. 1-6 show various examples, implementations are not limited in this regard. Other combinations and/or variations are also possible. For example, the computing device 500 shown in FIG. 5 may include other hardware components and/or software components.

In accordance with some implementations, examples are provided for prevention of CSRF attacks. In some implementations, a browser may present a protected webpage that includes one or more event listeners. An event listener may detect a user change in the browser that may indicate a navigation of the browser to a second website. In response, the event listener may send a lock request to the first website, thereby preventing execution of commands or actions triggered by malicious content of the second website. In this manner, some implementations may prevent or mitigate CSRF attacks.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:

a processor; and a storage medium including instructions executable by the processor to:

receive a request for a webpage from a client device;

in response to the received request, provide the webpage to a browser of the client device, the provided webpage including at least one event listener to detect a user change in the browser;

receive a lock request from the at least one event listener on the client device; and in response to the received lock request, lock a session of the webpage on the client device.

2. The computing device of claim 1, wherein the at least one event listener in the provided webpage comprises a first listener, wherein the first listener is executed by the browser to detect an event that changes the website presented in a current tab of the browser.

3. The computing device of claim 2, wherein the event that changes the website presented in the current tab comprises a user entry of a new web address in an address field of the current tab.

4. The computing device of claim 2, wherein the at least one event listener in the provided webpage also comprises a second listener, wherein the second listener is executed by the browser to detect a user change of a focus of the browser.

5. The computing device of claim 4, wherein the user change of the focus of the browser comprises one of a new tab being opened in the browser and the browser being minimized.

6. The computing device of claim 1, wherein the provided webpage comprises a third listener to, upon loading in the browser, send an unlock request to the computing device.

7. The computing device of claim 6, wherein the instructions are executable by the processor to:

receive the unlock request from the third listener; and in response to the received unlock request, unlock the session.

8. A non-transitory machine-readable storage medium storing instructions that upon execution cause a processor to:

receive, by a server, a request for a webpage from a client device;

in response to the received request, provide, by the server, the webpage to a browser of the client device, the provided webpage including at least one event listener to detect a user change in the browser;

receive, by the server, a lock request from the at least one event listener on the client device; and in response to the received lock request, lock, by the server, a session of the webpage on the client device.

9. The non-transitory machine-readable storage medium of claim 8, wherein the at least one event listener comprises a first listener to detect a user change of a focus of the browser.

10. The non-transitory machine-readable storage medium of claim 9, wherein the at least one event listener also comprises a second listener to detect an event that changes the website presented in a current tab of the browser.

11. The non-transitory machine-readable storage medium of claim 10, wherein the event that changes the website presented in the current tab comprises a user entry of a new web address in an address field of the current tab.

12. The non-transitory machine-readable storage medium of claim 9, wherein the user change of the focus of the browser comprises one of a new tab being opened in the browser and the browser being minimized.

13. The non-transitory machine-readable storage medium of claim 8, wherein the provided webpage includes a third listener to, upon loading in the browser, send an unlock request to the server.

14. A method, comprising:

receiving, by a server computer, a request for a webpage from a client device;

the server computer providing the webpage to a browser of the client device in response to the received request, the provided webpage including one or more event listeners to detect a user change in the browser;

the server computer receiving a lock request from the at least one event listener on the client device; and the server computer locking a session of the webpage on the client device in response to the received lock request.

15. The method of claim 14, further comprising:

executing a first listener in the browser of the client device, wherein the first listener is included in the one or more event listeners in the provided webpage.

16. The method of claim 15, further comprising:

detecting, by a first listener, an event that changes the website presented in a current tab of the browser; and in response to a detection of the event that changes the website presented in a current tab of the browser, the first listener sending the lock request to the server computer.

17. The method of claim 15, further comprising:

executing a second listener in the browser of the client device, wherein the second listener is also included in the one or more event listeners in the provided webpage.

18. The method of claim 17, further comprising:

detecting, by a second listener, a user change of a focus of the browser; and in response to a detection of the user change of the focus of the browser, the second listener sending the lock request to the server computer.

19. The method of claim 14, further comprising:

executing a third listener in the browser of the client device, wherein the third listener is included in the provided webpage, wherein executing the third listener includes sending an unlock request to the server upon loading the provided webpage in the browser.

20. The method of claim 14, further comprising:

after locking the session, the server computer receiving a data access request from the browser on the client device; and in response to the received data access request:

redirecting the browser to a home page of a protected website associated with the session; and unlocking the session.

* * * * *